US009544881B2

(12) United States Patent
Liu et al.

(10) Patent No.: US 9,544,881 B2
(45) Date of Patent: Jan. 10, 2017

(54) APPARATUSES, METHODS, AND COMPUTER PROGRAMS FOR A MOBILE TRANSCEIVER AND FOR A BASE STATION TRANSCEIVER

(75) Inventors: Jianguo Liu, Shanghai (CN); Zheng Liu, Shanghai (CN); Qi Jiang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 42 days.

(21) Appl. No.: 14/374,873

(22) PCT Filed: Jan. 30, 2012

(86) PCT No.: PCT/CN2012/070776
§ 371 (c)(1),
(2), (4) Date: Jul. 25, 2014

(87) PCT Pub. No.: WO2013/113145
PCT Pub. Date: Aug. 8, 2013

(65) Prior Publication Data
US 2015/0003360 A1    Jan. 1, 2015

(51) Int. Cl.
*H04W 72/04* (2009.01)
*H04W 72/12* (2009.01)
*H04L 5/00* (2006.01)

(52) U.S. Cl.
CPC .......... *H04W 72/0406* (2013.01); *H04L 5/001* (2013.01); *H04L 5/0037* (2013.01);
(Continued)

(58) Field of Classification Search
CPC .. H04W 24/10; H04W 72/12; H04W 72/1205; H04W 72/1263; H04W 72/1278; H04W 74/00; H04W 74/04; H04W 74/08; H04W 72/0406
See application file for complete search history.

(56) References Cited

U.S. PATENT DOCUMENTS

2011/0038275 A1  2/2011  Kim et al.
2011/0075624 A1  3/2011  Papasakellariou et al.
(Continued)

FOREIGN PATENT DOCUMENTS

CN  102170703 A   8/2011
CN  102265677 A  11/2011
(Continued)

OTHER PUBLICATIONS

"3rd Generation Partnership Project; Technical Specification Group Radio Access Network; Evolved Universal Terrestrial Radio Access (E-UTRA); Physical layer procedures, (Release 10)," 3GPP TS 36.213, V10.4.0 (Dec. 2011), 125 pages.
(Continued)

*Primary Examiner* — Ashley Shivers
(74) *Attorney, Agent, or Firm* — Fay Sharpe, LLP

(57) ABSTRACT

Embodiments provide methods, apparatuses and computer programs for a mobile transceiver 100 and for a base station transceiver 200 in a mobile communication system. The mobile transceiver apparatus 10 comprises means for receiving 12 a first configuration message from the base station transceiver 200. The first configuration message comprises information on a control region for the mobile transceiver 100. The control region indicates radio resources used by the base station transceiver 200 to transmit a control message to the mobile transceiver 100 on a control channel. The means for receiving 12 is operable to receive a second configuration message from the base station transceiver 200. The second configuration message comprises information on a search space. The search space indicates a subset of radio resources of the control region and the search space comprises a spatial radio resource. The mobile transceiver apparatus 10 further comprises means for controlling 14 the means for receiving 12 to receive the control message on the
(Continued)

control channel based on the information on the search space and the spatial resource using the plurality of antennas 110. The base station transceiver apparatus comprises corresponding means for generating the first and second configuration messages and for transmitting the configuration messages to the mobile transceiver.

16 Claims, 5 Drawing Sheets

(52) U.S. Cl.
CPC .......... *H04L 5/0053* (2013.01); *H04L 5/0091* (2013.01); *H04W 72/1278* (2013.01)

(56) References Cited

U.S. PATENT DOCUMENTS

| | | | |
|---|---|---|---|
| 2011/0110316 A1 | 5/2011 | Chen et al. | |
| 2011/0243090 A1 | 10/2011 | Grovlen et al. | |
| 2011/0274066 A1 | 11/2011 | Tee et al. | |
| 2011/0310856 A1* | 12/2011 | Hariharan | H04L 1/1607 370/336 |
| 2013/0039291 A1* | 2/2013 | Blankenship | H04L 5/001 370/329 |
| 2013/0058285 A1* | 3/2013 | Koivisto | H04L 1/0046 370/329 |
| 2013/0114521 A1* | 5/2013 | Frenne | H04L 5/0053 370/329 |
| 2013/0182654 A1* | 7/2013 | Hariharan | H04W 52/54 370/329 |

FOREIGN PATENT DOCUMENTS

| | | | | |
|---|---|---|---|---|
| KR | WO 2013069940 A1 * | 5/2013 | .......... | H04L 5/0094 |
| WO | 2010/070197 A1 | 6/2010 | | |

OTHER PUBLICATIONS

Huawei et al., "Considerations on the ePDCCH design," 3GPP TSG RAN WG1 Meeting #67, R1-113655, 5 pages, San Francisco, USA, Nov. 14-18, 2011.

Panasonic, "Consideration on search space design for enhanced PDCCH," 3GPP TSG RAN WG1 Meeting #67, R1-113816, 3 pages, San Francisco, USA, Nov. 14-18, 2011.

International Search Report for PCT/CN2012/070776 dated Nov. 15, 2012.

* cited by examiner

US 9,544,881 B2

APPARATUSES, METHODS, AND COMPUTER PROGRAMS FOR A MOBILE TRANSCEIVER AND FOR A BASE STATION TRANSCEIVER

Embodiments of the present invention relate to mobile communications, more particularly to signaling concepts for mobile communication systems using enhanced transmission concepts.

BACKGROUND

Demands for higher data rates for mobile services are steadily increasing. At the same time modern mobile communication systems, such as 3rd Generation systems (3G) and 4th Generation systems (4G), provide enhanced technologies, which enable higher spectral efficiencies and allow for higher data rates and cell capacities. One of the mobile communication systems currently under standardization by the 3rd Generation Partnership Project (3GPP) is the Long Term Evolution (LTE) system, the LTE-Advanced (LTE-A) system, respectively.

In LTE, each data transmission is usually signaled to a mobile transceiver or User Equipment (UE) via a control channel known as the Physical Downlink Control CHannel (PDCCH). Since the UE is not aware in advance of the exact format of the PDCCH, nor the exact transmission resources used for it, it has to perform multiple blind decodings of different possibilities in each sub-frame to check for the presence of a PDCCH addressing said UE. The information provided using the PDCCH is also called Downlink Control Information (DCI), and it may correspond to system information, random access control, paging and group power control commands. DCI formats may comprise a format for transmission of an UpLink Shared CHannel (UL-SCH) allocation, a transmission of a DownLink Shared CHannel (DL-SCH) allocation for Single Input Multiple Output (SIMO) operation, for a compact transmission of DL-SCH allocation for SIMO operation or allocating a dedicated preample signature to a UE for random access, a transmission control information of Multiple Input Multiple Output (MIMO) rank 1 based compact resource assignment, a very compact transmission of a Physical Downlink Shared Channel (PDSCH) assignment, a transmission with additional information of power offset, a transmission of DL-SCH allocation for closed and open loop MIMO operation, a transmission of a Transmit Power Control (TPC) command for an uplink channel, etc.

In Release 8 (Rel-8) of LTE, a UE monitoring the PDCCH needs to do 44 blind decoding attempts per sub-frame, which are arranged in two sets of transmission resources or coding combinations known as "search spaces", one is referred to as the Common Search Space (CSS), as it is shared between multiple UEs, and the other is referred to as UE Specific search Space (UESS). The number of blind decodes in the CSS in Release 8 is 12, while in the UESS it equals 32.

SUMMARY

Embodiments are based on the finding that advanced transmission technologies or methods, e.g. Carrier Aggregation (CA), Cooperative MultiPoint transmission (CoMP), Multiple-Input-Multiple-Output (MIMO), beamforming, etc., are enhancements of future communication systems to enhance transmission capacity. Moreover, it is a finding of embodiments that these transmission technologies can also be used for control channels, i.e. to enhance the capacity of control channels. For example, in 3GPP Rel-11, the design of an enhanced Physical Downlink Control Channel (ePDCCH) can be considered based on CA enhancement through a new carrier type, CoMP and DownLink (DL) MIMO. It is a further finding that an enhanced PDCCH would be located in a legacy Physical Downlink Shared Channel (PDCCH) region, to maintain backward compatibility. Embodiments are based on a finding that a new search space for an ePDCCH may be desirable. Unlike the search space design for legacy PDCCH, the search space of ePDCCH may be designed to take an increased control channel capacity, an improved spatial reuse of control channel resource, beamforming and/or diversity transmission, and operation on a new carrier type and in a Multimedia Broadcast and Multicast Service (MBMS) Single Frequency Network (MBSFN), into account.

It is a further finding that the search space design method for legacy PDCCH is unsuitable for ePDCCH, because of the larger search space that is created by the utilization of the spatial components. Embodiments may therefore provide a concept for a search space for ePDCCH that takes the spatial dimension into account, while keeping the overall search space size and the blind decoding efforts at a mobile transceiver moderate. In other words, embodiments are based on the finding that a search space for ePDCCH can be designed, which can well support the new features of ePDCCH such as beamforming/transmit diversity, and spatial reuse of control channel resources for ePDCCH transmission.

Embodiments therefore provide an apparatus for a mobile transceiver of a mobile communication system, i.e. embodiments may provide said apparatus to be operated by or included in a mobile transceiver. In the following, the apparatus will also be referred to as mobile transceiver apparatus. The mobile communication system may, for example, correspond to one of the mobile communication systems standardized by 3GPP, as Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Orthogonal Frequency Division Multiple Access (OFDMA), Code Division Multiple Access (CDMA), etc. In the following the terms mobile communication system and mobile communication network are used synonymously.

In embodiments, the mobile transceiver may be implemented in a transceiver of the mobile or wireless end of one of the above networks, i.e. the mobile transceiver may correspond to a smartphone, a cell phone, a user equipment, a laptop, a notebook, a personal computer, a Personal Digital Assistant (PDA), an Universal Serial Bus (USB)—stick, a car, etc. The mobile transceiver may also be referred to as UE in line with the 3GPP terminology.

Furthermore, the mobile communication system comprises a base station transceiver for communicating with the mobile transceiver. Details on the base station transceiver and an according base station transceiver apparatus will be provided subsequently. The mobile transceiver operates a plurality of antennas, e.g. to make use of one of the above mentioned enhanced transmission technologies. The mobile transceiver apparatus comprises means for receiving a first configuration message from the base station transceiver. The first configuration message comprises information on a control region for the mobile transceiver and the control region indicates radio resources used by the base station transceiver to transmit a control message to the mobile transceiver on a control channel. The means for receiving can correspond to a receiver, such as a receiver for OFDMA-, CDMA-, or radio signals of the above systems in general.

The control channel can be used to signal to the mobile transceiver that payload data has been scheduled to it and to provide detailed information on the radio resources on which said payload data is scheduled. In other words, the control message, which is received by the mobile transceiver on the control channel, comprises information on radio resources of a data channel. The means for receiving can be operable to receive the payload data from the base station transceiver on the radio resources of the data channel.

The means for receiving is operable to further receive a second configuration message from the base station transceiver. The second configuration message comprises information on a search space and the search space indicates a subset of radio resources of the control region. In other words, two configuration messages can be received by the mobile transceiver apparatus, the first of which providing information on a control region, the second one providing information on a search space, which lies within the control region or corresponds to a subset of the radio resources establishing the control region. Furthermore, the search space comprises a spatial radio resource, i.e. the search space considers spatial resources, such as, for example, a MIMO-channel, a precoding vector, a beam, transmit/receive diversity, an antenna port, a spatial multiplexing channel, etc. The information on the spatial resource can be comprised in the first configuration message and/or in the second configuration message. The mobile transceiver apparatus further comprises means for controlling the means for receiving to receive the control message on the control channel based on the information on the search space and the spatial resource using the plurality of antennas. That is to say, the plurality of antennas at the mobile transceiver is used to iterate through the spatial dimension of the search space in order to find the control message. The means for controlling can correspond to a controller, a processor or processing unit, a micro-controller, etc.

In other words, firstly, a UE-specific control region can be configured using the first configuration message, e.g. using a radio resource management protocol. One prominent protocol of the 3GPP specifications is the Radio Resource Control (RRC) protocol, cf. Technical Specification (TS) 25.331/36.331 series of 3GPP specifications, which could be used for the purpose of configuring the control region. In other words, in some embodiments RRC signaling can be used so as to limit the probable range of an ePDCCH for each UE to the control region.

Embodiments may also provide an apparatus for a base station transceiver of the mobile communication system, i.e. embodiments may provide said apparatus to be operated by or included in a base station transceiver. In the following, the apparatus will also be referred to as base station transceiver apparatus. The mobile communication system and the base station transceiver may correspond to one of the above described mobile communication systems or base station transceivers, i.e. the base station transceiver can comply with one of the above mentioned communication systems. Such a base station transceiver can be located in the fixed or stationary part of the network or system, it may correspond to a remote radio head, an access point, a macro-cell, a small-cell, a micro-cell, a femto-cell, etc. A base station transceiver can be a wireless interface of a wired network, which enables transmission of radio signals to a user equipment or mobile transceiver. Such a radio signal may comply with radio signals as, for example, standardized by 3GPP or, generally, in line with one or more of the above listed systems. Thus, a base station transceiver may correspond to a NodeB, an eNodeB, an access point, etc.

In line with what was described above for the mobile transceiver apparatus, the base station transceiver apparatus comprises means for generating the first configuration message, which comprises information on the control region for the mobile transceiver and which indicates radio resources used by the base station transceiver to transmit the control message to the mobile transceiver on the control channel. The means for generating is further operable to generate the second configuration message, the second configuration message comprising information on the search space, which indicates a subset of radio resources of the control region and the spatial radio resource. The means for generating may correspond to a processor or processing unit, a controller, a microprocessor, etc. The base station transceiver apparatus further comprises means for transmitting the first and the second control messages to the mobile transceiver. The means for transmitting can correspond to a transmitter, such as a transmitter for OFDMA, CDMA signals or radio signals of the above systems in general.

In line with the above, in some embodiments the control message comprises information on radio resources of a data channel and the means for transmitting can be operable to transmit payload data to the mobile transceiver on the radio resources of the data channel.

Moreover, in some embodiments the search space comprises a number of control channel candidates, e.g. PDCCH or eDPCCH candidates, wherein each candidate corresponds to a number of Control Channel Elements (CCE) and wherein each CCE can correspond to a set of combinations of Orthogonal Frequency Division Multiplexing (OFDM) sub-carriers and symbols. A CCE may correspond or may be mapped to a set of combinations of subcarriers and time slots or symbols. There may not be an unambiguous correspondence between CCEs and subcarriers/timeslots, in embodiments it may be done via a complex interleaving and mapping functions. A combination of a subcarrier and a time slot or time symbol may also be referred to as Physical Resource Block (PRB). In some embodiments, multiple frequency layers may have multiple subcarriers, may be arranged in repetitive radio frames, and each radio frame may be subdivided in multiple time slots, time symbols, OFDM symbols, radio frames, sub-frames, time transmission intervals, etc. A CCE may comprise four consecutive subcarriers in an OFDM symbol and a PDCCH candidate may correspond to a number of aggregated CCEs. To the number of CCEs in a PDCCH candidate it may also be referred to as an aggregation level of the PDCCH candidate.

In embodiments, the search space may correspond to a plurality of combinations of at least one of or a combination of the group of a control channel element, a sub-carrier, a sub-frame, a time slot, a precoding configuration, a beam-forming configuration, an antenna port, a spatial multiplex channel, or a diversity configuration.

That is to say, the mobile transceiver and the base station transceiver may use repetitive radio frames for communicating. The repetitive radio frames may comprise a plurality of sub-frames and a sub-frame may comprise a plurality of time slots or symbols. The control region may correspond to a first subset of time slots or symbols in sub-frames of a radio frame and the search space may correspond to a second subset of time slots or symbols in the sub-frames of the radio frame, wherein the first subset of time slots or symbols comprises the second subset of time slots or symbols. In some embodiments the mobile communication system corresponds to a LTE or LTE-A system and the first and second configuration messages correspond to RRC messages. In some embodiments, the second configuration message may correspond to a new DCI format used on the PDCCH. The control channel may correspond to an ePDCCH and the control message may comprise further DCI.

The second configuration message may comprise information on a size of the search space in terms of a number of time slots, CCEs, or symbols, e.g. within the control region. The second configuration message may comprise an offset of the search space in terms of an offset number of time slots, CEEs, or symbols relative to a reference time slot, CCE, or symbol. The reference time slot, symbol, or CCE can, for example, be the beginning or the first time slot, CCE or symbol of a sub-frame or radio frame. Moreover, the second configuration message may comprise an identifier of a group of a plurality of mobile transceivers to which the mobile transceiver is associated. For example, the two mobile transceivers may form a group which is spatially multiplexed. The group may be identified with the same identifier and a mobile transceiver may be identified through the different spatial resources in the group. In embodiments the means for controlling can be operable to determine the search space based on a hashing function, which is based on the information on the search space, and/or a sub-frame number.

In embodiments, two different ways or methods may be used to configure the UE-specific search space within the UE-specific control region, e.g. for ePDCCH transmission. In a first set of embodiments an explicit way of configuring can be used. E.g., the exact position of the UE-specific search space can be explicitly indicated to the UE through dynamic signaling. Herein, a new DCI format can be used like the DCI foimat for data demodulation to configure the UE-specific search space. The explicit way may provide a higher flexibility for the configuration of the UE-specific search space than the implicit variant described subsequently. The higher flexibility may result in an additional signaling overhead.

In another set of embodiments an implicit way of configuring may be used. E.g., a hash function can be used to implicitly configure the position of UE-specific search space for ePDCCH blind decoding. The positioning of paired ePDCCHs for MultiUser-MIMO (MU-MIMO) transmission can be considered in the design of the hash function. For example, the group-Radio Network Temporary Identity (RNTI) assigned for paired UEs can be used during the design of hash function so as to ensure the spatial multiplexing at the same CCEs for the paired UEs. Moreover, the configuration of a DeModulation Reference Signal (DMRS) port can be taken into consideration for the hash function design to support multi-layer BeamForming (BF). The implicit way may reduce the signaling overhead with proper blind decoding efforts.

Embodiments may provide a mobile transceiver comprising the above mobile transceiver apparatus and a base station transceiver comprising the above base station transceiver apparatus. Embodiments may further provide a mobile communication system comprising a mobile transceiver with a mobile transceiver apparatus according to the above description and/or a base station transceiver with a base station transceiver apparatus according to the above description.

Embodiments may further provide a method for a mobile transceiver of a mobile communication system, which comprises a base station transceiver for communicating with the mobile transceiver. The mobile transceiver operates a plurality of antennas. The method comprises a step of receiving a first configuration message from the base station transceiver. The first configuration message comprises information on a control region for the mobile transceiver and the control region indicates radio resources used by the base station transceiver to transmit a control message to the mobile transceiver on a control channel. The method comprises a further step of receiving a second configuration message from the base station transceiver. The second configuration message comprises information on a search space and the search space indicates a subset of radio resources of the control region, wherein the search space comprises a spatial radio resource. The method further comprises a step of controlling a reception of the control message on the control channel based on the information on the search space and the spatial resource using the plurality of antennas.

Embodiments further provide a method for a base station transceiver of a mobile communication system, which comprises the base station transceiver for communicating with a mobile transceiver. The method comprises a step of generating a first configuration message, which comprises information on a control region for the mobile transceiver. The control region indicates radio resources used by the base station transceiver to transmit a control message to the mobile transceiver on a control channel. The method further comprises a step of generating a second configuration message, which comprises information on a search space. The search space indicates a subset of radio resources of the control region, wherein the search space comprises a spatial radio resource. The method comprises a further step of transmitting the first and the second control messages to the mobile transceiver.

Embodiments further provide a computer program having a program code for performing one of the above described methods, when the computer program is executed on a computer or processor.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME EMBODIMENTS

Figure 1:
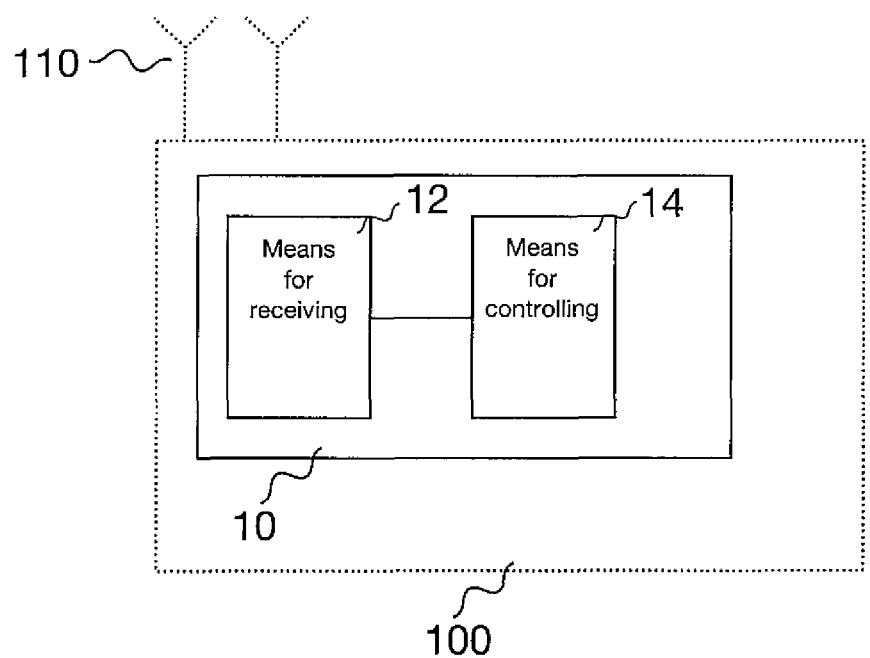
FIG. 1 shows an embodiment of an apparatus for a mobile transceiver.

FIG. 1 shows an embodiment of an apparatus 10 for a mobile transceiver 100 in a mobile communication system. The mobile transceiver 100 is shown in dotted lines, as it is optional. Embodiments may provide a mobile transceiver 100 comprising a mobile transceiver apparatus 10. The mobile communication system also comprises a base station transceiver 200 for communicating with the mobile transceiver 100 of which an embodiment will be detailed using FIG. 2. The mobile transceiver 100 operates a plurality of antennas 110, which are also shown in dotted lines in FIG. 1 as they are part of the optional mobile transceiver 100. The mobile transceiver apparatus 10 comprises means for receiving 12 a first configuration message from the base station transceiver 200. The first configuration message comprises information on a control region for the mobile transceiver 100 and the control region indicates radio resources used by the base station transceiver 200 to transmit a control message to the mobile transceiver 100 on a control channel. The means for receiving 12 is operable to receive a second configuration message from the base station transceiver 200. The second configuration message comprises information on a search space and the search space indicates a subset of radio resources of the control region, wherein the search space comprises a spatial radio resource. The mobile transceiver apparatus 10 further comprises means for controlling 14 the means for receiving 12 to receive the control message on the control channel based on the information on the search space and the spatial resource using the plurality of antennas 110. The means for receiving 12 is coupled with the means for controlling 14.

Figure 2:
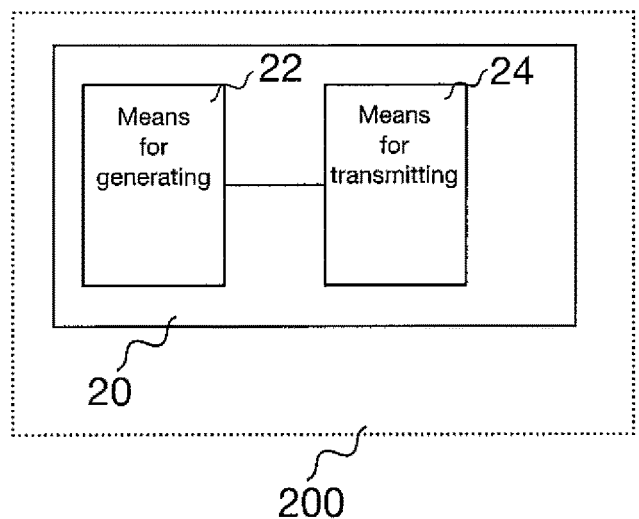
FIG. 2 shows an embodiment of an apparatus for a base station transceiver.

FIG. 2 illustrates an embodiment of an apparatus 20 for the base station transceiver 200 of the mobile communication system. The optional base station transceiver 200 is indicated by dotted lines in FIG. 2. The mobile communication system comprises the base station transceiver 200 for communicating with the mobile transceiver 100 according to FIG. 1. The apparatus 20 comprises means for generating 22 the first configuration message comprising information on the control region for the mobile transceiver 100, which indicates radio resources used by the base station transceiver 200 to transmit the control message to the mobile transceiver 100 on the control channel. The means for generating 22 is operable to generate the second configuration message comprising information on the search space, which indicates the subset of radio resources of the control region and the spatial radio resource. The base station transceiver apparatus 20 further comprises means for transmitting 24 the first and the second control messages to the mobile transceiver 100. The means for generating 22 is coupled with the means for transmitting 24.

In further embodiments the control message comprises information on radio resources of a data channel, e.g. information on a transport format that is used to transmit payload data from the base station transceiver 200 to the mobile transceiver 100. For example, the payload transmission can be carried out using the PDSCH, thus, in embodiments the means for transmitting 24 of the base station transceiver apparatus 20 can be operable to transmit payload data to the mobile transceiver 100 on the radio resources of the data channel, e.g. the PDSCH.

In the following embodiments of the mobile transceiver apparatus 10 and the base station transceiver apparatus 20 will be described, which are operable in an LTE or LTE-A system. Moreover, the embodiments implement a search space design for an ePDCCH, e.g. for Rel-11 UEs. These embodiments may provide advantages in that they may support increased control channel capacity, achieve improved spatial reuse of control channel resources, support beamforming and/or diversity, operate on new carrier types and in MBSFN sub-frames, and/or support Rel-8/9/10 DCI formats and new DCS formats.

In Rel-10, DCI for system information, random access control, paging and group power control commands are transmitted in the common search space of the PDCCH. The Rel-11 UEs that are scheduled by ePDCCH still may need to acquire common search space information. Considering the co-existence of legacy PDCCH and ePDCCH, two ways could be considered to transmit the common search space information to the advanced UEs scheduled by ePDCCH. First, the common search space information for all UEs (including legacy UEs and advanced UEs) could be derived from the legacy PDCCH. In the case of a single carrier, the legacy PDCCH would be on the same carrier. In the case of a new carrier type, the legacy PDCCH could be on a different carrier. In both cases, the common signaling may not be able to benefit from beamforming, and frequency-domain ICIC may not be available for the common search space except by CA-based Inter-Cell Interference Coordination (ICIC) with cross-carrier scheduling. Also, it should be borne in mind that the scheduling capacity of the common search space could be limited. Second, the UEs scheduled by ePDCCH could acquire the common search space information from ePDCCH and other UEs from legacy PDCCH. Potential gain of frequency-domain ICIC may also be available for the common search space transmissions in this case, at the expense of a higher overhead from the duplicated common information transmission.

For the following embodiments it is assumed that the common search space remains entirely on the legacy PDCCH, which may not be the case for other embodiments.

In the following, the UE-specific search space will be considered for an embodiment. In contrast to relay backhaul transmission where only a Relay-Physical Downlink Control Channel (R-PDCCH) can be detected, there would be two UE-specific search spaces which are located in legacy PDCCH and ePDCCH for control capacity extension. Obviously, legacy UEs would be scheduled in the Rel-10 PDCCH region whereas Rel-11 UEs would expect both of the UE-specific search spaces. Due to the limited processing capability of UEs, the total number of blind decodes should be shared between the legacy and ePDCCHs. Signaling may therefore be introduced for Rel-11 UEs to configure the split between the ePDCCH and legacy PDCCH search spaces. This could allow a configurable split, between the whole UE-specific search space being on the ePDCCH and the whole UE-specific search space being on the legacy PDCCH.

The position of each UE's specific search space in the legacy control region can be derived based on a Hashing function, the output of which can be jointly determined by the UE's assigned RNTI and sub-frame number. The utilization of the Hashing function can reduce the probability of CCE blocking. The positioning of the UE-specific search space in ePDCCH also may need further consideration. There are two possible ways to position each UE-specific search space for ePDCCH, which will be detailed subsequently. First, a dynamic signaling can be used to explicitly indicate the exact position of the UE-specific search space in embodiments. Second, a Hashing function can be used to implicitly configure the position of the UE-specific search space in embodiments.

The dynamic way could provide the most flexibility for the configuration of the UE-specific search space at the cost of additional overhead. Both localized and distributed resource allocation would be well supported. Using a Hashing function can reduce the overhead by imposing some constraint on the configuration. This constraint may decrease the performance gain achieved by localized transmission. However, the localized transmission gain could still be exploited and the effect may not be such prominent since blind decoding would always be used to detect the multiple candidates in the UE-specific search space. The positioning of the paired ePDCCHs for MU-MIMO transmission may be a challenge in designing the Hashing function. A group-RNTI assigned for the paired users could be used as the initiating point of the Hashing function so the specific search spaces of the paired UEs could be aligned.

The ePDCCH can be expected to be able to support beamforming and/or diversity. Beamforming is implemented only in good geometry, so high aggregation levels such as aggregation level 8 and 4 seem to be unnecessary for the UE-specific search space configured to use beamforming transmission. The same aggregation levels as legacy PDCCH (i.e. aggregation levels 8, 4, 2 and 1) may be kept for diversity transmission to ensure the robustness in embodiments. The number of candidates at each aggregation level could be the same as legacy PDCCH to save standardization efforts. Blind decoding of the UE-specific search spaces using beamforming and diversity may be separately carried out. Some approaches to reduce the maximal number of blind decoding may need to be studied considering new DCI format(s) may be introduced in Rel-11 to support advanced transmission modes.

Figure 3:
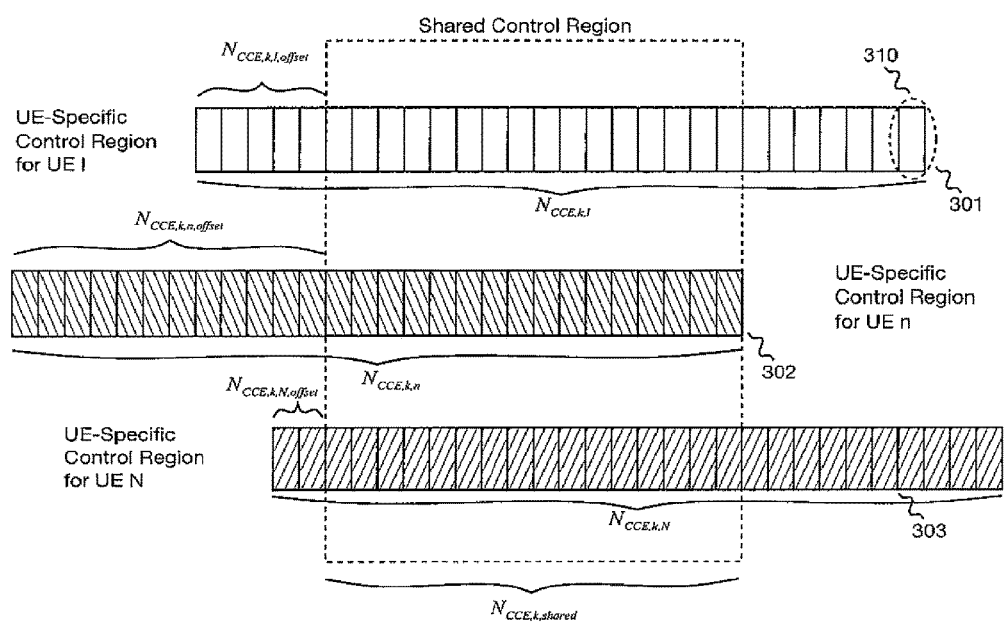
FIG. 3 depicts a view graph illustrating search spaces of three mobile transceivers.

The search space comprises a number of Control Channel candidates, wherein each candidate corresponds to a number of CCEs and each CCE corresponds to a set of combinations of OFDM sub-carriers and symbols according to the LTE or LTE-A specifications. The mobile transceiver 100 and the base station transceiver 200 use repetitive radio frames for communicating, which comprise a plurality of sub-frames and a sub-frame comprises a plurality of time slots and symbols. FIG. 3 illustrates sub-frames 301, 302, and 303, for three different mobile transceivers or UEs. The sub-frames 301, 302, 303 comprise a plurality of subsequent CCEs, which are shown as vertical separations, one of which is exemplified as CCE 310. Furthermore, FIG. 3 illustrates UE specific control regions for three UEs 1 (at the top), n (at the center), and N (at the bottom). The control regions correspond to first subsets of time slots or CCEs in sub-frames of a radio frame and they are mutually offset.

In this embodiment, firstly, UE-specific control regions will be configured for each UE 1, n, N, by RRC signaling, which is used to limit the probable range of ePDCCH per UE for reduction of decoding effort. In other words, the first configuration message corresponds to an RRC-message. The control region configured in a UE-specific way may utilize scheduling gain for the improvement of control channel capacity, since UE-specific advantageous radio resources can be configured. For example, a localized or continuous control region can be allocated for closed-loop transmission if the serving cell can be aware of UE's Channel State Information (CST), otherwise a distributed control region can be allocated to the UE for open-looped transmission, e.g. to take advantage of frequency diversity. In some embodiments, e.g. in similarity to the legacy PDCCH, the CCE may be defined as the minimum resource mapping granularity for DCI transmission, the size of CCE can be, but is not limited to, the size of CCE in the legacy CCE. In embodiments, a CCE may correspond to a combination of radio resources, e.g. a combination of at least one sub-carrier and at least one time slot or symbol, where multiple symbols can be comprised in one time slot, e.g. there may be 6 or 7 OFDM symbols in a time slot.

Moreover, in line with FIG. 3, for the present embodiment it is assumed that the total number of CCEs in the UE-specific control region of sub-frame k for UE 1 is $N_{CCE,k,1}$, $N_{CCE,k,n}$ for UE n, and $N_{CCE,k,N}$ for UE N, respectively. Moreover, the UE-specific search space for ePDCCH transmission can be configured within the UE-specific control region. The search space corresponds to a second subset of time slots or CCE in the sub-frames of the radio frame, the first subset of time slots or CCEs comprises the second subset of time slots or CCEs. That is to say the search space may lie within the control region. In the following two embodiments will be described, which use different ways of configuring the UE-specific search space of ePDCCH.

The first embodiment makes use of the explicit way. In this case, dynamic signaling is used to explicitly indicate the exact position of the UE-specific search space within the configured UE-specific control region. A new DCT format can be designed to carry the dynamic signaling, which is similar to DCI format used for the resource allocation indication of legacy PDSCH. In the new DCI format, the following configuration information may be configured to identify UE-specific search space for ePDCCH transmission. A resource allocation type may be configured as a field for indicating the resource mapping type for ePDCCH DCI transmission. Distributed or localized resource mapping type can be used to achieve the frequency diversity or scheduling gain. Moreover, CCE assignment information may be configured as a field for specifying selected CCEs in the control region. In this way, the new feature of ePDCCH (e.g. transmit diversity, beamforming/precoding and MU-MIMO etc.) can be well supported by the dynamic UE-specific search space design. But a signaling overhead may result for the dynamic configuration. The second configuration message may correspond to an RRC message to configure the search space on the ePDCCH or it may correspond to a new or additional DCI format.

For the explicit method, an additional PDCCH and higher layer signaling, e.g. RRC, can be used to carry the configuration, such as e.g. the precoding, Modulation and Coding Scheme (MCS) indications and resource allocation indication of ePDCCH, of ePDCCH transmission. When an additional PDCCH is used, the ePDCCH transmission can be dynamically configured, and also it may be not necessary to blindly decode the ePDCCH if the PDCCH includes some dedicated information such as aggregation level and a DCI format of the ePDCCH. A major challenge of embodiments using the explicit signaling approach may be the additional overhead aroused. Each ePDCCH scheduled UE may need an additional PDCCH to carry the scheduling indication information. As an alternative way, the higher layer RRC signaling can also be used to semi-statically configure or reconfigure scheduling indication information for ePDCCH. However, the ePDCCH may lose some of the gain derived by scheduling/precoding or frequency diversity etc.

In another embodiment an implicit way of signaling or determining the UE specific search space may be used. Similar to the legacy PDCCH, a hash function can be designed to implicitly configure the position of UE-specific search space for ePDCCH blind decoding. For MU-MIMO transmission, the same CCEs can be used for the spatial multiplexing of the paired UEs. That is to say, in MU-MIMO at least two UEs may share the same CCE and use spatial multiplexing for separating their control messages. Such UEs are also referred to as grouped, paired, or associated UEs. Herein, the group RNTI assigned for the paired UEs can be used during the design of the hash function to position the paired ePDCCH. Then, the UE-specific control region of the paired UEs grouped for MU-MIMO transmission at the same CCEs can be overlapped with each other. In the embodiment, if the paired UEs are allocated a unified control region, the group-RNTI can be signaled to the paired UE by RRC. Hence, the second configuration message comprises an identifier of a group of a plurality of mobile transceivers (group-RNTI) to which the mobile transceiver 100 is associated. In order to limit an increase of the blind decoding attempts in the spatial domain, the number of blind decoding combinations can be made independent of the number of the configured antenna ports. The number of antenna ports can be considered by the UE for decoding trials for the ePDCCH, e.g. as part of the spatial resource indicated by the search space, the second configuration message, respectively.

In the embodiment, if each grouped UE is allocated a different UE-specific control region, the size of the shared control region, and the offset of start point between the UE-specific control region and the shared control region should be signaled to the paired UE besides the group-RNTI. The second configuration message then comprises information on a size of the search space in terms of a number of time slots or CCEs and the second configuration message comprises an offset of the search space in terms of an offset number of time slots or CCEs relative to a reference time slot or CCE. This is also illustrated in FIG. 3. Herein, provided that number of CCEs for the UE-specific control region of UE n is $N_{CCE,k,n}$, the number of CCEs for the shared control region of the paired UEs is $N_{CCE,k,shared}$, the offset of the respective start point between UE-specific control region and shared control region is $N_{CCE,k,n,offset}$. The reference time slot or CCE corresponds to the first time slot or CCE of the respective sub-frame in FIG. 3.

In embodiments, for the spatial multiplexing of MIMO transmission, the multi-layer resources can be used for ePDCCH transmission at the same time for improvement of control channel capacity. Therefore the number of used antenna ports can be taken into consideration of the hash function design to support multi-layer BF. In this case, the start point of UE-specific search space can be configured based on the design of hash function as following:

$$Z_{k,n} = Y_{k,n} \mathrm{mod}(\lfloor (\overline{N_{CCE,k,n}} \times N_{port,k,n})/L \rfloor) + \overline{N_{CCE,k,n,offset}}$$

$$Y_{k,n} = (A \cdot Y_{k-1,n}) \mathrm{mod} D$$

$$Y_{-1,n} = n_{n,RNTI} \neq 0 \quad (1)$$

where k is the number of sub-frame within a radio frame; $N_{port,k,n}$ is the number of used antenna ports or the rank of a precoding matrix, which can be obtained from the DMRS configuration for ePDCCH transmission as part of one of the configuration messages. L is the aggregation level of DCI, which can, for example, be set to 1/2/4/8 as the same as the aggregation level of legacy PDCCH, but not limited thereto. In embodiments, any aggregations levels can be used. "A" and "D" are "big enough numbers", which could be set to 39827 and 65537, but not limited thereto. Any prime numbers may be used for "A" and "D", preferably larger than 1000. For different transmission schemes, the parameters ($\overline{N_{CCE,k,n}}$, $\overline{N_{CCE,k,n,offset}}$, and $n_{n,RNTI}$) in equation (1) can be specified as below:

For UEs paired for MU-MIMO transmission with the same UE-specific control region $$\overline{N_{CCE,k,n}} = N_{CCE,k,shared}$$

$$\overline{N_{CCE,k,n,offset}} = 0$$

$$n_{n,RNTI} = n_{n,group\_RNTI} \quad (2)$$

where $N^{CCE,k,shared}$ is the size or the number of CCEs in the shared control region for the paired UE n, $n_{n,group\_RNTI}$ is the value of group-RNTI for the grouped UE n.

For UEs paired for MU-MIMO transmission with different UE-specific control region $$\overline{N_{CCE,k,n}} = N_{CCE,k,shared}$$

$$\overline{N_{CCE,k,n,offset}} = N_{CCE,k,n,offset}$$

$$n_{n,RNTI} = n_{n,group\_RNTI} \quad (3)$$

where $N_{CCE,k,shared}$ is the size of CCEs in the shared control region for the paired UE n, $N_{CCE,k,n,offset}$ is the offset of start point between UE-specific control region and shared control region, and $n_{n,group\_RNTI}$ is the value of group-RNTI for the paired UE.

Otherwise $$\overline{N_{CCE,k,n}} = N_{CCE,k,n}$$

$$\overline{N_{CCE,k,n,offset}} = 0$$

$$n_{n,RNTI} = n_{n,C\_RNTI} \quad (4)$$

where $N_{CCE,k,n}$ is the size of CCEs in the shared control region for the paired UE n, $N_{CCE,k,n,offset}$ is the offset of start point between UE-specific control region and shared control region, and $n_{n,group\_RNTI}$ is the value of group-RNTI for the paired UE.

In this embodiment, the search spaces of ePDCCH would be defined by a set of ePDCCH candidates. Based on equation (1), the CCEs corresponding to ePDCCH candidate m of the search space $S_k^{(L)}$ at aggregation level L in sub-frame k for UE n can be given by:

$$L \cdot \{(Y_{k,n} + m) \mathrm{mod} \lfloor (\overline{N_{CCE,k,n}} \times N_{port,k,n})/L \rfloor\} + \overline{N_{CCE,k,n,offset}} + i$$

where i=0, . . . , L−1. For the serving cell on which ePDCCH is monitored, if the monitoring UE is configured with carrier indicator field ten M'=m+M$^{(L)} \cdot n_{CI}$ where $n_{CI}$ is the carrier indicator field value, else if the monitoring UE is not configured with carrier indicator field then m'=m, where m=0, . . . , M$^{(L)}$−1. M$^{(L)}$ is the number of ePDCCH candidates to monitor in the given search space.

For the implicit UE-specific search space configuration way, the signaling overhead can bereduced compared to the explicit way with proper blind decoding efforts.

Figure 4:
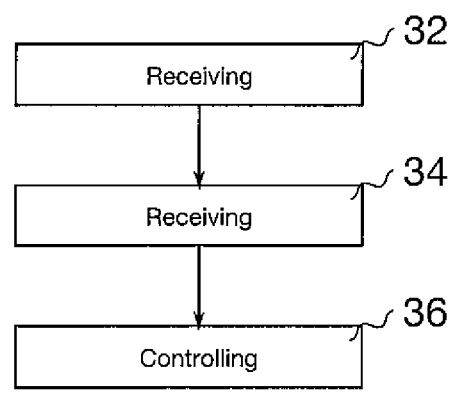
FIG. 4 shows a block diagram of a flow chart of an embodiment of a method for a mobile transceiver.

FIG. 4 shows a block diagram of a flow chart of an embodiment of a method for a mobile transceiver 100 of a mobile communication system. The mobile communication system comprises a base station transceiver 200 for communicating with the mobile transceiver 100. The mobile transceiver 100 operates a plurality of antennas 110. The method comprises a step of receiving 32 a first configuration message from the base station transceiver 200. The first configuration message comprises information on a control region for the mobile transceiver 100 and the control region indicates radio resources used by the base station transceiver 200 to transmit a control message to the mobile transceiver 100 on a control channel. The method further comprises a step of receiving 34 a second configuration message from the base station transceiver 200. The second configuration message comprises information on a search space and the search space indicates a subset of radio resources of the control region. The search space comprises a spatial radio resource. The method further comprises a step of controlling 36 a reception of the control message on the control channel based on the information on the search space and the spatial resource using the plurality of antennas 110.

Figure 5:
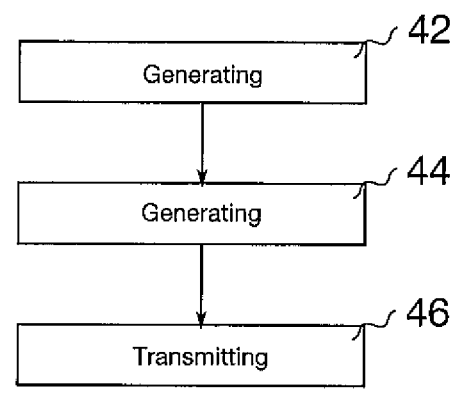
FIG. 5 shows a block diagram of a flow chart of an embodiment of a method for a base station transceiver.

FIG. 5 shows a block diagram of a flow chart of an embodiment of a method for a base station transceiver 200 of a mobile communication system. The mobile communication system comprises the base station transceiver 200 for communicating with a mobile transceiver 100. The method comprises a step of generating 42 a first configuration message. The first configuration message comprises information on a control region for the mobile transceiver 100 and the control region indicates radio resources used by the base station transceiver 200 to transmit a control message to the mobile transceiver 100 on a control channel. The method further comprises a step of generating 44 a second configuration message. The second configuration message comprises information on a search space and the search space indicates a subset of radio resources of the control region. The search space comprises a spatial radio resource. The method further comprises a step of transmitting 46 the first and the second control messages to the mobile transceiver 100.

Embodiments may further provide a computer program having a program code for performing one of the above methods, when the computer program is executed on a computer or processor.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for transmitting", "means for receiving", "means for controlling", "means for generating", etc., may be provided through the use of dedicated hardware, such as "a transmitter", "a receiver", "a controller", "a generator", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for a mobile transceiver of a mobile communication system, the mobile communication system comprising a base station transceiver for communicating with the mobile transceiver, the mobile transceiver operating a plurality of antennas, the apparatus comprising:
   a receiver configured to receive a first configuration message from the base station transceiver, the first configuration message comprising information on a control region for the mobile transceiver, the control region indicating radio resources used by the base station transceiver to transmit a control message to the mobile transceiver on a control channel,
   wherein the receiver is operable to receive a second configuration message from the base station transceiver, the second configuration message comprising information on a search space, the search space indicating a subset of radio resources of the control region, wherein the search space comprises a spatial radio resource; and
   a processor configured to control the receiver to receive the control message on the control channel based on the information on the search space and the spatial resource using the plurality of antennas.

2. The apparatus of claim 1, wherein the control message comprises information on radio resources of a data channel, wherein the receiver is operable to receive payload data from the base station transceiver on the radio resources of the data channel and/or wherein the search space comprises a number of Control Channel candidates, wherein each candidate corresponds to a number of control channel elements and wherein each control channel element corresponds to a set of combinations of Orthogonal Frequency Division Multiplexing sub-carriers and symbols.

3. The apparatus of claim 1, wherein the mobile transceiver and the base station transceiver use repetitive radio frames for communicating, the repetitive radio frames comprise a plurality of sub-frames and a sub-frame comprises a plurality of time slots or symbols, and wherein the control region corresponds to a first subset of time slots or symbols in sub-frames of a radio frame and wherein the search space corresponds to a second subset of time slots or symbols in the sub-frames of the radio frame, the first subset of time slots or symbols comprising the second subset of time slots or symbols.

4. The apparatus of claim 1, wherein the mobile communication system corresponds to a Long Term Evolution or a Long Term Evolution-Advanced system, wherein the first configuration message corresponds to a Radio Resource Control message and wherein the second configuration message corresponds to a Radio Resource Control message or Downlink Control Information, wherein the control channel corresponds to an enhanced Physical Downlink Control Channel, and wherein the control message comprises further Downlink Control Information.

5. The apparatus of claim 1, wherein the second configuration message comprises information on a size of the search space in terms of a number of time slots or Control Channel Elements, wherein the second configuration message comprises an offset of the search space in terms of an offset number of time slots Control Channel Elements relative to a reference time slot Control Channel Element, and/or wherein the second configuration message comprises an identifier of a group of a plurality of mobile transceivers to which the mobile transceiver is associated.

6. The apparatus of claim 1, wherein the search space corresponds to a plurality of combinations of at least one of or a combination of the group of a control channel element, a sub-carrier, a sub-frame, a time slot, a symbol, a precoding configuration, a beamforming configuration, an antenna port, a spatial multiplex channel, or a diversity configuration.

7. The apparatus of claim 1, wherein processor is operable to determine the search space based on a hashing function which is based on the information on the search space and a sub-frame number.

8. An apparatus for a base station transceiver of a mobile communication system, the mobile communication system comprising the base station transceiver for communicating with a mobile transceiver, the apparatus comprising:
a processor configured to generate a first configuration message, the first configuration message comprising information on a control region for the mobile transceiver, the control region indicating radio resources used by the base station transceiver to transmit a control message to the mobile transceiver on a control channel;
wherein the processor is operable to generate a second configuration message, the second configuration message comprising information on a search space, the search space indicating a subset of radio resources of the control region, wherein the search space comprises a spatial radio resource; and
a transmitter configured to transmit the first and the second configuration messages to the mobile transceiver.

9. The apparatus of claim 8, wherein the control message comprises information on radio resources of a data channel, wherein the transmitter is operable to transmit payload data to the mobile transceiver on the radio resources of the data channel and/or wherein the search space comprises a number of Control Channel candidates, wherein each candidate corresponds to a number of control channel elements and wherein each control channel element corresponds to a set of combinations of Orthogonal Frequency Division Multiplexing sub-carriers and symbols.

10. The apparatus of claim 8, wherein the mobile transceiver and the base station transceiver use repetitive radio frames for communicating, the repetitive radio frames comprise a plurality of sub-frames and a sub-frame comprises a plurality of time slots or symbols, and wherein the control region corresponds to a first subset of time slots or symbols in sub-frames of a radio frame and wherein the search space corresponds to a second subset of time slots or symbols in the sub-frames of the radio frame, the first subset of time slots or symbols comprising the second subset of time slots or symbols.

11. The apparatus of claim 8, wherein the mobile communication system corresponds to a Long Term Evolution or a Long Term Evolution-Advanced system, wherein the first configuration message corresponds to a Radio Resource Control message and wherein the second configuration message corresponds to a Radio Resource Control message or Downlink Control Information, wherein the control channel corresponds to an enhanced Physical Downlink Control Channel, and wherein the control message comprises further Downlink Control Information.

12. The apparatus of claim 8, wherein the second configuration message comprises information on a size of the search space in terms of a number of time slots or Control Channel Elements, wherein the second configuration message comprises an offset of the search space in terms of an offset number of time slots or Control Channel Elements relative to a reference time slot or Control Channel Element, and/or wherein the second configuration message comprises an identifier of a group of a plurality of mobile transceivers to which the mobile transceiver is associated.

13. A method for a mobile transceiver of a mobile communication system, the mobile communication system comprising a base station transceiver for communicating with the mobile transceiver, the mobile transceiver operating a plurality of antennas, the method comprising:
receiving a first configuration message from the base station transceiver, the first configuration message comprising information on a control region for the mobile transceiver, the control region indicating radio resources used by the base station transceiver to transmit a control message to the mobile transceiver on a control channel;
receiving a second configuration message from the base station transceiver, the second configuration message comprising information on a search space, the search space indicating a subset of radio resources of the control region, wherein the search space comprises a spatial radio resource; and
controlling a reception of the control message on the control channel based on the information on the search space and the spatial resource using the plurality of antennas.

14. A non-transitory computer-readable medium having stored thereon a computer program having a program code for performing the method of claim 13, when the computer program is executed on a computer or processor.

15. A method for a base station transceiver of a mobile communication system, the mobile communication system comprising the base station transceiver for communicating with a mobile transceiver, the method comprising:
generating a first configuration message, the first configuration message comprising information on a control region for the mobile transceiver, the control region indicating radio resources used by the base station transceiver to transmit a control message to the mobile transceiver on a control channel;

generating a second configuration message, the second configuration message comprising information on a search space, the search space indicating a subset of radio resources of the control region, wherein the search space comprises a spatial radio resource; and transmitting the first and the second configuration messages to the mobile transceiver.

16. A non-transitory computer-readable medium having stored thereon a computer program having a program code for performing the method of claim 15, when the computer program is executed on a computer or processor.

* * * * *